(12) United States Patent
Bernatz

(10) Patent No.: US 8,167,571 B2
(45) Date of Patent: May 1, 2012

(54) HORIZONTAL AXIS WIND TURBINE ROTOR ASSEMBLY WITH LIFTING BODY ROTOR BLADES

(76) Inventor: Thomas Stewart Bernatz, Taos, NM (US)

( * ) Notice: Subject to any disclaimer, the term of this patent is extended or adjusted under 35 U.S.C. 154(b) by 677 days.

(21) Appl. No.: 12/290,863

(22) Filed: Nov. 3, 2008

(65) Prior Publication Data

US 2011/0123345 A1    May 26, 2011

Related U.S. Application Data

(60) Provisional application No. 61/002,087, filed on Nov. 5, 2007.

(51) Int. Cl.
*F03B 3/12* (2006.01)
(52) U.S. Cl. .................. 416/227 R; 416/175; 416/203; 416/227 A; 416/231 R
(58) Field of Classification Search .................. 416/175, 416/198 R, 203, 227 A, 227 R, 231 R; 290/44, 290/55
See application file for complete search history.

(56) References Cited

U.S. PATENT DOCUMENTS

| 467,824 A | * | 1/1892 | Myers et al. .................. 416/203 |
| 708,519 A | | 9/1902 | Bradshaw |
| 2,159,653 A | | 10/1936 | Carlin |
| 2,384,893 A | | 2/1942 | Crook |
| 2,552,651 A | | 5/1951 | Skold |
| 4,560,358 A | | 12/1985 | Adler |
| 6,064,123 A | | 5/2000 | Gislason |
| 6,264,136 B1 | | 7/2001 | Weston |
| 6,622,483 B2 | * | 9/2003 | Denniss ......................... 60/398 |
| 7,018,167 B2 | * | 3/2006 | Yoshida .................... 416/227 A |
| 7,396,208 B1 | * | 7/2008 | Hussain .......................... 416/91 |
| 2007/0205602 A1 | * | 9/2007 | Willey et al. .................... 290/44 |

* cited by examiner

*Primary Examiner* — Alexander Ghyka
*Assistant Examiner* — Bryan Junge
(74) *Attorney, Agent, or Firm* — Schiff Hardin LLP

(57) ABSTRACT

A horizontal axis wind turbine rotor assembly utilizes rotor blades having the aerodynamic characteristics of low aspect ratio lifting bodies. The aerodynamic characteristics of low aspect ratio lifting bodies at typical operating wind velocities permits high energy conversion efficiencies throughout a wide range of wind speeds.

21 Claims, 10 Drawing Sheets

HORIZONTAL AXIS WIND TURBINE ROTOR ASSEMBLY WITH LIFTING BODY ROTOR BLADES

The present invention relates to a horizontal axis wind turbine rotor assembly with attached rotor blades having the aerodynamic characteristics of a low aspect ratio lifting body rather than a higher aspect ratio wing. Reference is made to provisional patent application No. 61/002,087, filed Nov. 5, 2007 by Thomas Stewart Bematz.

BACKGROUND OF THE INVENTION

Wind turbines in the prior art have largely been designed with rotor blades having the aerodynamic characteristics of wings. Wings have been characterized in the prior art according to their aspect ratio. The aspect ratio is discussed in U.S. Pat. No. 6,264,136, issued on Jul. 24, 2001 to Weston. In the prior art, aspect ratios for wings have been defined perhaps somewhat ambiguously as the ratio of the spanwise length of the wing to the mean chordal length of the wing. Aspect ratios for wings are typically greater than 3:1.

Rotor assemblies of wind turbines in the prior art have typically consisted of airfoiled wings with aspect ratios far exceeding 3:1 and approaching 30:1 and even greater. Disadvantages of this type of wind turbine rotor assembly include self-limiting aerodynamic drag characteristics associated with wings, mechanical stress associated with the very long lever arm of the wing blade, high noise level, and high visual impact.

Also in the prior art, there are aerodynamic structures known as low aspect ratio lifting bodies. Low aspect ratio lifting bodies have been distinguished from higher aspect ratio wings in that lifting bodies have an aspect ratio of less than 2:1, whereas wings have aspect ratios greater than 3:1. Additionally, lifting bodies have been distinguished from wings by certain definite advantageous aerodynamic characteristics in certain applications, which include a higher coefficient of lift at high angles of attack, and generally more favorable drag characteristics, discussed in part in U.S. Pat. No. 2,384,893, issued on Sep. 18, 1945 to Crook.

Also in the prior art, there are wind turbines known as horizontal axis type wind turbines. U.S. Pat. No. 6,064,123, issued on May 16, 2000 to Gislason, describes the general features and operation of horizontal axis wind turbines.

OBJECTS OF THE INVENTION

The primary object of the present invention is to provide a novel horizontal axis wind turbine rotor assembly that utilizes low aspect ratio lifting bodies as the rotor blades of the wind turbine rotor assembly, with the lifting body rotor blades having a planform aspect ratio less than 2:1.

Another object of the present invention is to provide a novel horizontal axis wind turbine rotor assembly that may also utilize hybrid lifting bodies as the rotor blades of the wind turbine rotor assembly, with the hybrid lifting body rotor blades having a planform aspect ratio less than 3:1 and greater than 2:1.

SUMMARY OF THE INVENTION

According to the present invention, there is provided a horizontal axis wind turbine rotor assembly whose rotor blades are generally planar in geometry and have the aerodynamic characteristics of low aspect ratio lifting bodies rather than of wings. The central hub of the wind turbine rotor assembly is positioned on an axis of rotation that is generally horizontal and parallel to incident wind streams such that the center point of the central hub is coincident with the axis and such that the central hub may rotate about the axis in a rotational plane perpendicular to the axis. The central hub has a designated upwind side defining the upwind side of the wind turbine rotor assembly which will normally be positioned into incident wind such that the incident wind first contacts the wind turbine rotor assembly on the upwind side.

The lifting body rotor blades are attached at intervals around the perimeter of the central hub. For each lifting body rotor blade, there is a root connection point that is the point at which the lifting body rotor blade is attached to the central hub. The root connection point of the lifting body rotor blade corresponds to, and is attached at, its corresponding attachment point on the central hub. Attachment of the lifting body rotor blade to the central hub is effected such that the manner of attachment minimizes the area of contact between the lifting body rotor blade and the central hub, so as to minimize the extent to which the attachment interrupts or interferes with the shape of the lifting body rotor blade.

For the purpose of explanation, in order to precisely define the planform aspect ratio of a lifting body rotor blade, there is herein defined the term "neutral position." The neutral position is defined as the position of the lifting body rotor blade such that the plane described by the lifting body rotor blade is coplanar with the rotational plane described by the central hub to which the lifting body rotor blade is attached. The operating position of the lifting body rotor blade varies depending on the application and differs from the neutral position.

The axis described by the line between the center-point of the central hub and the root connection point of a lifting body rotor blade attached to the central hub in the neutral position, when extended to the opposite, outermost edge of the lifting body rotor blade, is the root axis of the lifting body rotor blade. The line segment coincident with the root axis of the lifting body rotor blade, extending from the root connection point of the lifting body rotor blade to the outside edge of the lifting body rotor blade, is the span line of the lifting body rotor blade. The length of the span line is the span of the lifting body rotor blade.

A chord line of a lifting body rotor blade is a line intersecting the span line, perpendicular to the span line, and intersecting and terminating at the two opposing outermost edges of the lifting body rotor blade. The length of a chord line is the dimension along the chord line between the opposing outermost edges. The chordal width of a lifting body rotor blade is the length of the longest chord of the lifting body rotor blade thus defined.

Because there is some ambiguity in the prior art regarding the meaning and definition of the aspect ratio, and because the term has been defined somewhat differently in its application to wings and to lifting bodies, there is herein defined the term "planform aspect ratio" for lifting body rotor blades of the present disclosure including those rotor blades that are a hybrid of lifting bodies and wings. The planform aspect ratio of a lifting body rotor blade is the ratio of the span of the lifting body rotor blade to the greatest chordal width of the lifting body rotor blade. The planform aspect ratio for lifting body rotor blades is thus distinguished from the aspect ratio for wings, which is generally understood to be the ratio of the spanwise length of the wing to the mean chordal length of the wing. For purposes of this invention rotor blades of a hybrid nature of lifting bodies and wings having a planform aspect ratio between 3:1 and 2:1, are considered a subset type of lifting body rotor blade.

According to the present invention, lifting body rotor blades attached to the central hub of a wind turbine rotor assembly shall have a planform aspect ratio less than 2:1.

Also according to the present invention, hybrid lifting body rotor blades may be utilized which have a planform aspect ratio of less than 3:1 and greater than 2:1.

Each lifting body rotor blade attached to a central hub is oriented so that during operation it is angled away from the planar face of the upwind side of the central hub, and thus angled away from the neutral position. The angle established by rotating the lifting body rotor blade about its root axis is the angle of incidence of the rotor blade relative to the rotational plane described by the central hub. The angle of incidence of the lifting body rotor blade relative to the rotational plane described by the central hub defines the angle of attack of the lifting body rotor blade relative to an incident wind stream.

Each lifting body rotor blade is geometrically substantially planar in form with two opposite-facing surfaces with one surface being an upwind surface and the other surface being a downwind surface. Each surface may independently be flat or curved with constant or varying curvature with the overall surface and sections of the surface having the general characteristics of airfoils similar in airfoil profile to modern aircraft wing airfoil profiles. The optimum design(s) of lifting body rotor blades and hybrid lifting body rotor blades is to be determined. It is believed that optimum design features may include ring-shaped forms, or more generally, lifting body rotor blades and hybrid lifting body rotor blades may include apertures. Different sizes and shapes of lifting body rotor blades may be utilized within the same horizontal axis wind turbine rotor assembly. Lifting body rotor blades may have differing sizes and shapes of apertures even within the same horizontal axis wind turbine rotor assembly.

A preferred embodiment of a lifting body rotor assembly has been constructed, this prototype utilizing twelve ring-shaped overlapping lifting body rotor blades. Alternate embodiments of rotor assemblies may have differing numbers and combinations of lifting body rotor blades and hybrid lifting body rotor blades. Alternate embodiments of rotor assemblies may have blades which do not overlap.

It is believed that wind turbines employing this invention will achieve higher energy conversion efficiencies than existing wind turbine designs employing wing-type rotor blades due in part to advantageous lift-to-drag characteristics of lifting bodies depending on their particular shape and the velocity of incident wind. It is believed that anticipated higher energy conversion efficiencies will be due in part to reduced tip vortices.

It is anticipated that particular combinations of features of central hub and lifting body rotor blade design including the size of lifting body rotor blades, the relative size of lifting body rotor blades with respect to the central hub, the relative size and shape of apertures with respect to lifting body rotor blade geometry, the lifting body rotor blade count, the orientation of lifting body rotor blades, and the particular surface geometry of central hubs and lifting body rotor blades will exhibit particular advantages.

Preferred embodiments of the present invention present a large reactive surface area to incident wind compared to rotor assemblies of comparable swept area employing wing-type rotor blades. It is anticipated that this factor will contribute further advantages to wind turbines employing lifting body rotor assemblies. It is also anticipated that the present invention will exhibit increased structural reliability due to use of relatively smaller rotor blades and larger hubs.

Low aspect ratio lifting bodies can exhibit advantageous lift-to-drag characteristics at high relative wind velocities and high angles of attack compared to higher aspect ratio wings. It is anticipated that wind turbine rotor assemblies employing lifting body rotor blades rather than wing-type rotor blades will allow the possibility of faster rotation at comparable wind speeds, thus potentially generating more power over a wider range of wind speeds.

While wind speeds generally increase at greater heights, improved performance of lifting body rotor blades may reduce the necessary height at which a wind turbine employing the current invention must be elevated for efficient operation. Owing to the reduced diameter of the lifting body rotor assembly, and the possibly reduced requirements for tower height, this invention may permit the use of wind turbines in areas where it is important to minimize the visual impact created by a wind turbine. For similar reasons, this invention permits installation of a greater number of wind turbines on a given land mass.

It is believed that this invention can be used in both upwind and downwind applications.

It has been observed and it is anticipated that wind turbines employing the current invention will operate more quietly than wind turbines employing wing-type rotor assemblies.

BRIEF DESCRIPTION OF THE DRAWINGS

The invention may take physical form in certain parts and arrangement of parts, preferred embodiments and alternate embodiments of the invention which are described in detail in the specification and illustrated in the accompanying drawings which form a part hereof, and wherein.

DETAILED DESCRIPTION OF THE PREFERRED EMBODIMENTS

Figures 1A, 1B:
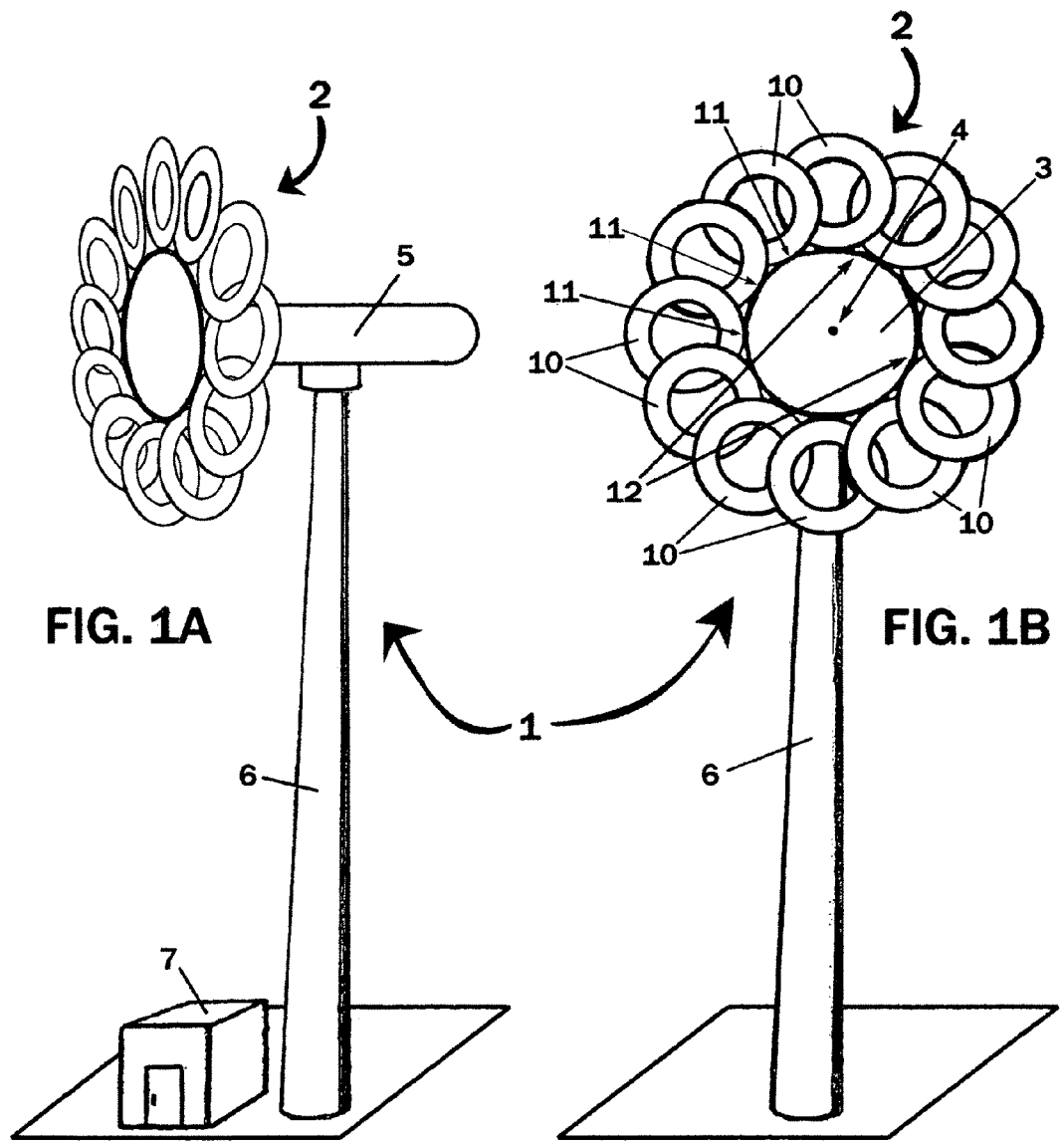
FIGS. 1A and 1B are perspective and elevation views of a utility-scale wind turbine employing a rotor assembly with twelve overlapping lifting body rotor blades.

Referring now more specifically to the drawings, wherein the showings are for the purpose of illustrating the preferred embodiments of the invention only and not for purposes of limiting the same, there is shown in FIGS. 1A and 1B a horizontal axis wind turbine 1. The horizontal axis wind turbine rotor assembly 2 has a central hub 3, rotatable about center point 4, attached to an energy conversion device 5, which may be an electrical generator. The energy conversion device 5 is elevated on tower 6 in such a manner as to allow the energy conversion device 5 to pivot into an oncoming wind stream and thereby orient the upwind side of the rotor assembly 2 into contact with the oncoming wind stream, consequently allowing the rotor assembly 2 to rotate about its axis of rotation in response to the incident wind. The height of tower 6 is variable according to local considerations including prevailing wind conditions and visual impact. The utility shed 7 is depicted to demonstrate possible relative scale of a preferred embodiment of the invention.

Figure 2:
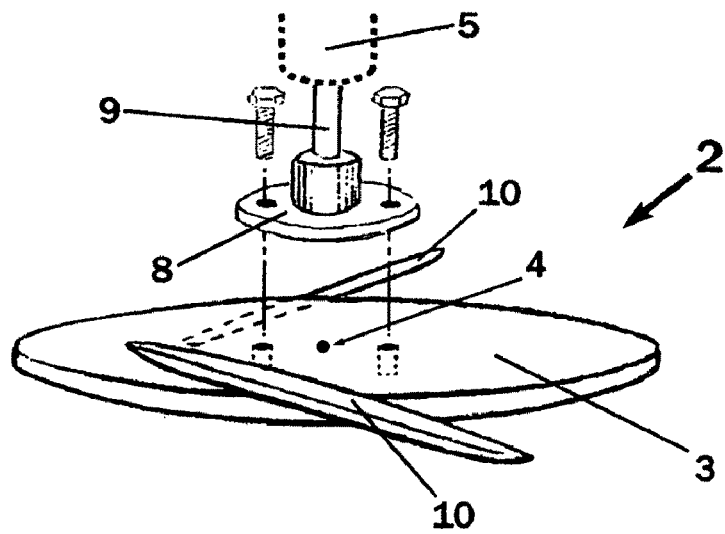
FIG. 2 is an exploded perspective view of a rotor assembly with two blades depicting a method for attaching the rotor assembly to an energy conversion device.

FIG. 2 shows an exploded view of a preferred method of attachment of a preferred embodiment of a wind turbine rotor assembly 2 to an energy conversion device 5, wherein the rotatable central hub 3 attaches at center point 4 of the downwind side of rotatable central hub 3 to mounting flange 8 of drive shaft 9 of energy conversion device 5.

Figure 3:
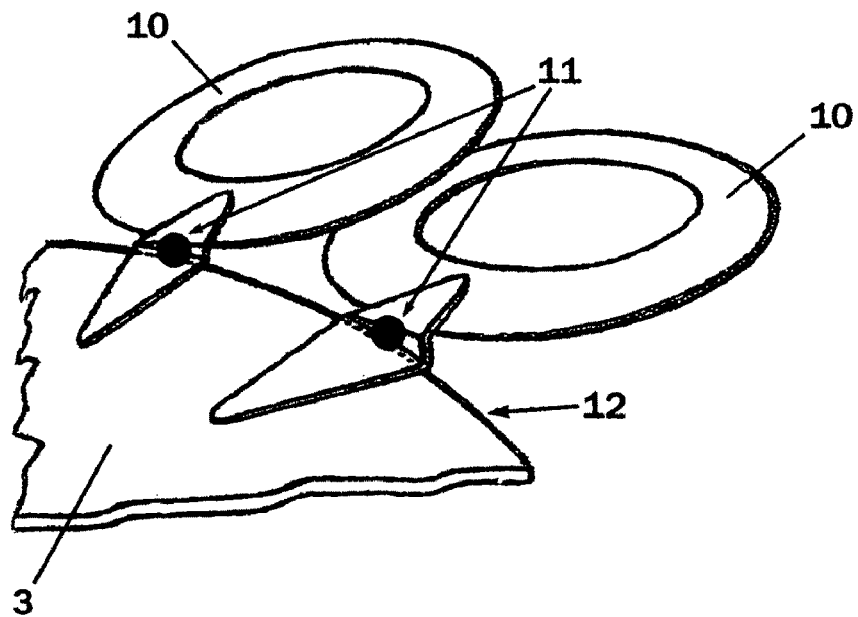
FIG. 3 is a perspective view of a hub section with two attached lifting body rotor blades depicting the root connection attachments of the two lifting body rotor blades.
Figure 4A:
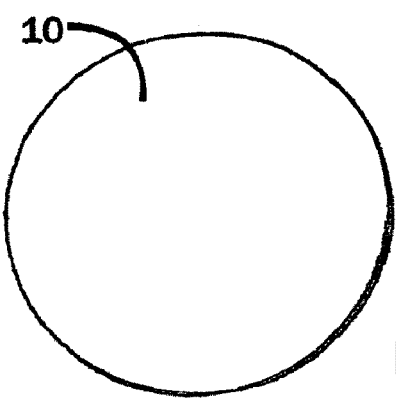
FIGS. 4A-4F and 5A-5F are planform views of variously shaped lifting body rotor blades, some with and some without apertures, some having concentric apertures and others having non-concentric apertures, and some with apertures of different geometric shape than that of the outer perimeter of the lifting body rotor blade.
Figure 4B:
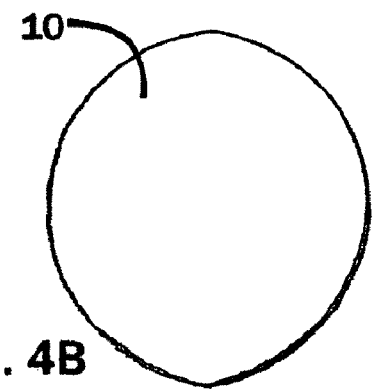
Figure 4C:
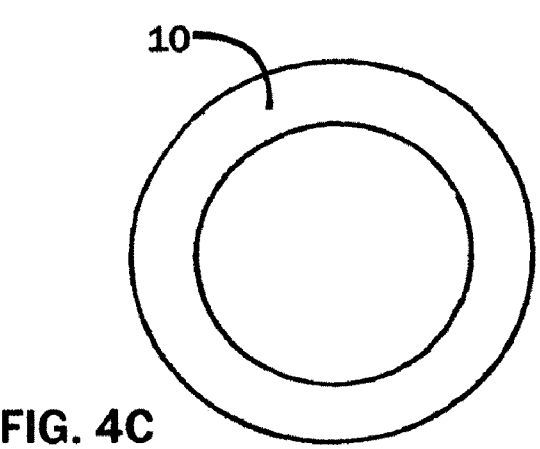
Figure 4D:
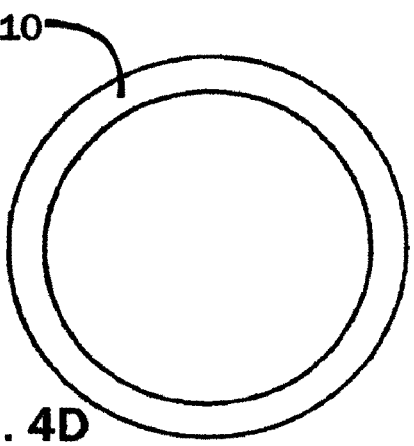
Figure 4E:
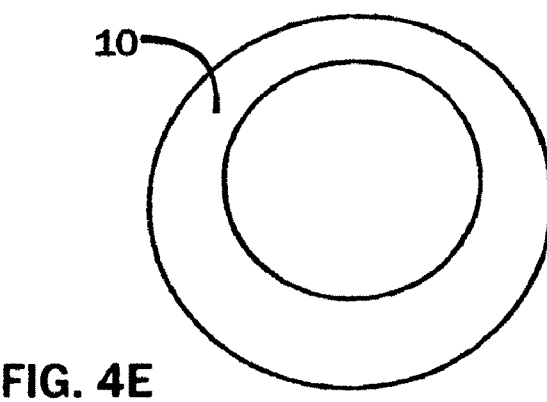
Figure 4F:
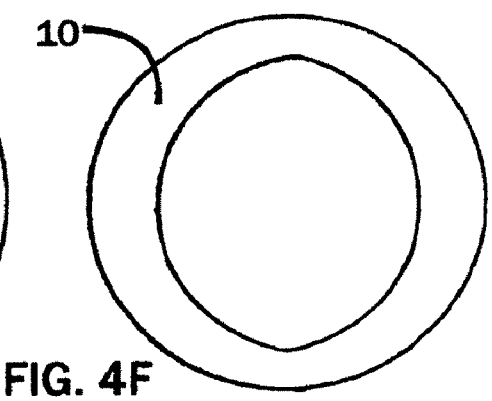
Figure 5A:
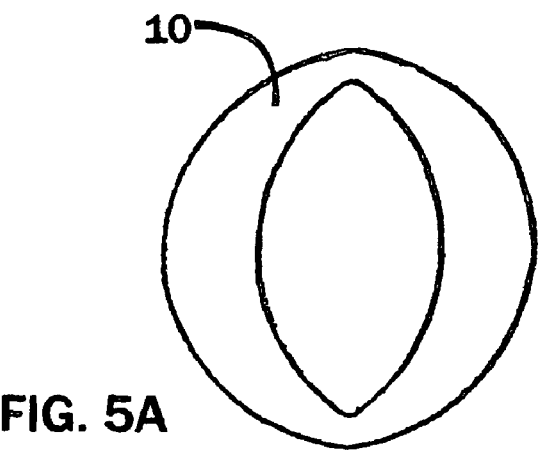
Figure 5B:
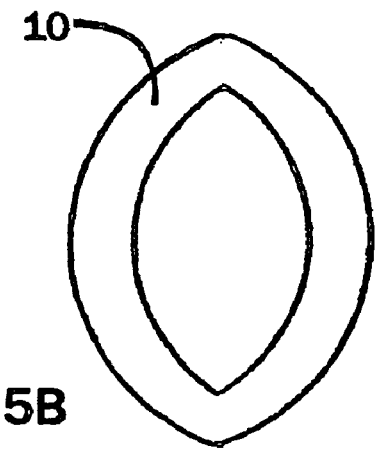
Figure 5C:
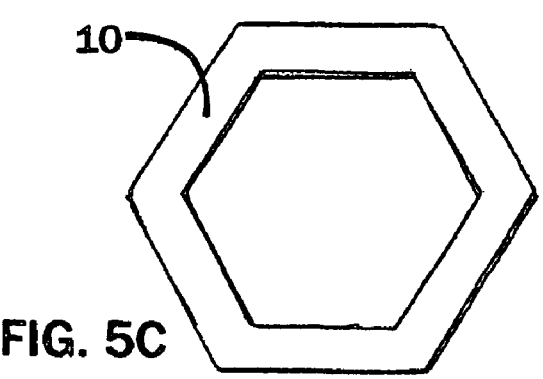
Figure 5D:
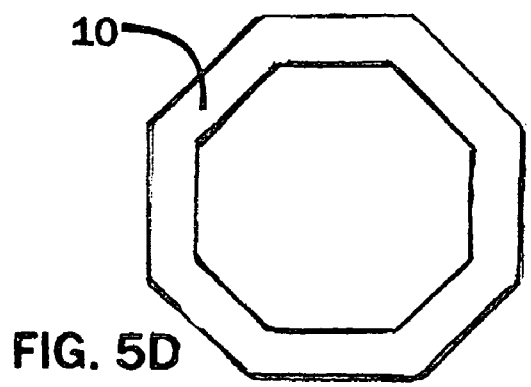
Figure 5E:
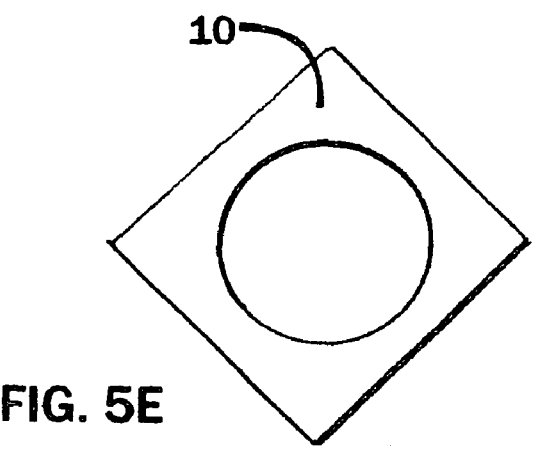
Figure 5F:
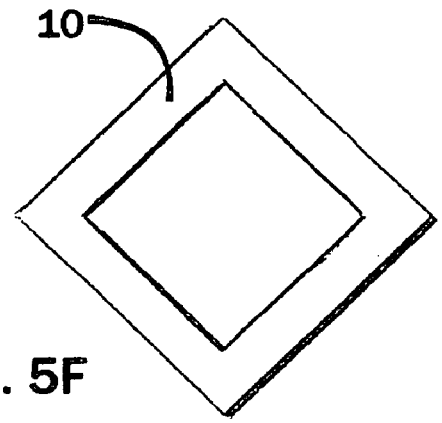

FIG. 3 shows a preferred embodiment of a means for attaching lifting body rotor blades 10 to a section of a rotatable central hub 3 wherein mounting straps are affixed to the rotatable central hub 3, thereby defining and constituting attachment points at the perimeter 12 of the hub 3, to which attachment points are attached lifting body rotor blades 10 such that the root connection points 11 of blades 10 correspond with the attachment points.

Lifting body rotor blades 10 utilized in a single embodiment of a wind turbine rotor assembly 2 may be of consistent shapes and sizes. Alternate embodiments of a wind turbine rotor assembly 2 may have lifting body rotor blades 10 of varying shapes and sizes, yet still possessing the characteristics of lifting body rotor blades. Possible alternate shapes of lifting body rotor blades 10 are depicted in FIGS. 4A-4F and 5A-5F. Alternate embodiments of lifting body rotor blades 10 may include apertures of different geometric shape than that of the outer perimeter of the lifting body rotor blade. Apertures may vary in size and location relative to the blades in which they are included.

Alternate embodiments utilizing lifting body rotor blades 10 having planform aspect ratio of up to 2:1 may, as well, utilize hybrid lifting body rotor blades 10 having planform aspect ratio between 3:1 and 2:1.

Figure 6A:
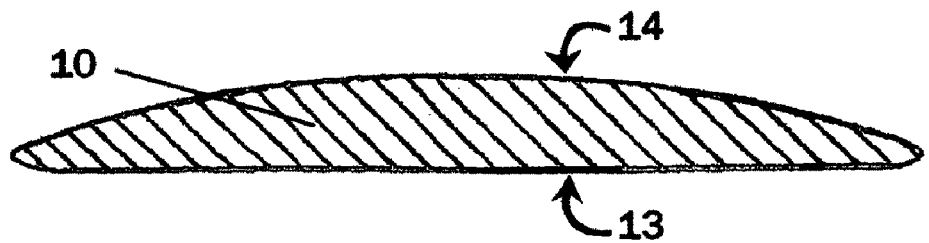
FIG. 6A is a cross section view of a solid lifting body rotor blade.
Figure 6B:
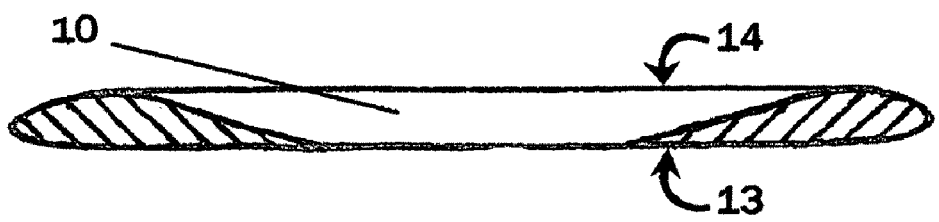
FIG. 6B is a cross section view of a lifting body rotor blade with an aperture.
Figure 6C:
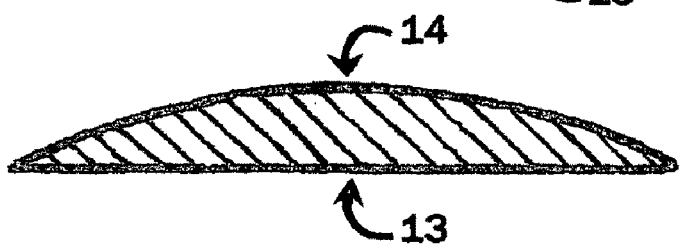
FIGS. 6C-6F are views of possible alternate airfoil profiles exhibiting various curvatures of upwind and downwind surfaces applicable to solid lifting body rotor blades, lifting body rotor blades with apertures, and sections of lifting body rotor blades with apertures.
Figure 6D:
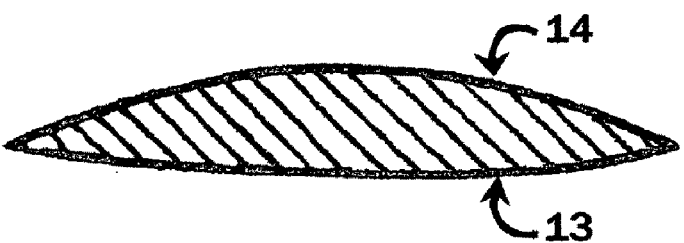
Figure 6E:
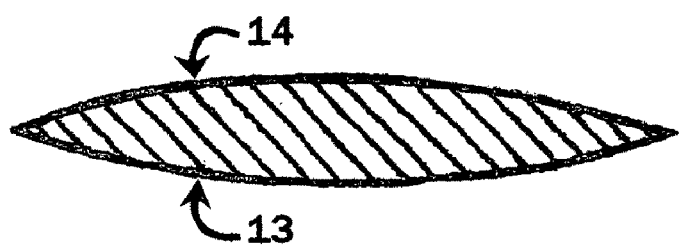
Figure 6F:
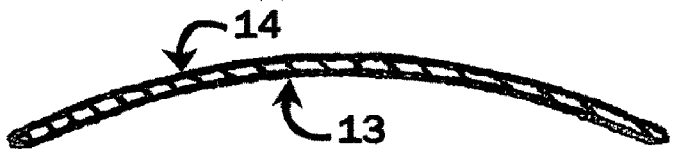

Possible alternate curvatures of upwind surfaces 13 and downwind surfaces 14 of lifting body rotor blades 10 are depicted in FIGS. 6A-6F. FIG. 6A shows the airfoil profile of a central cross section of a lifting body rotor blade 10 lacking an aperture. FIG. 6B shows the airfoil profile of a central cross section of a lifting body rotor blade 10 that includes an aperture. The cross section shown in FIG. 6B depicts the airfoil profile of the entire lifting body rotor blade 10 defined by surfaces 13 and 14 and reveals the independent airfoil profiles of opposing sections of the rotor blade defined by the outermost portions of surfaces 13 and 14 and the innermost portions of surfaces 13 and 14 converging at the aperture. FIGS. 6C-6F depict possible alternate airfoil profiles of entire lifting body rotor blades. The airfoil profiles of FIGS. 6C-6F may alternately define the shapes of sections of lifting body rotor blades with apertures.

Figure 7A:
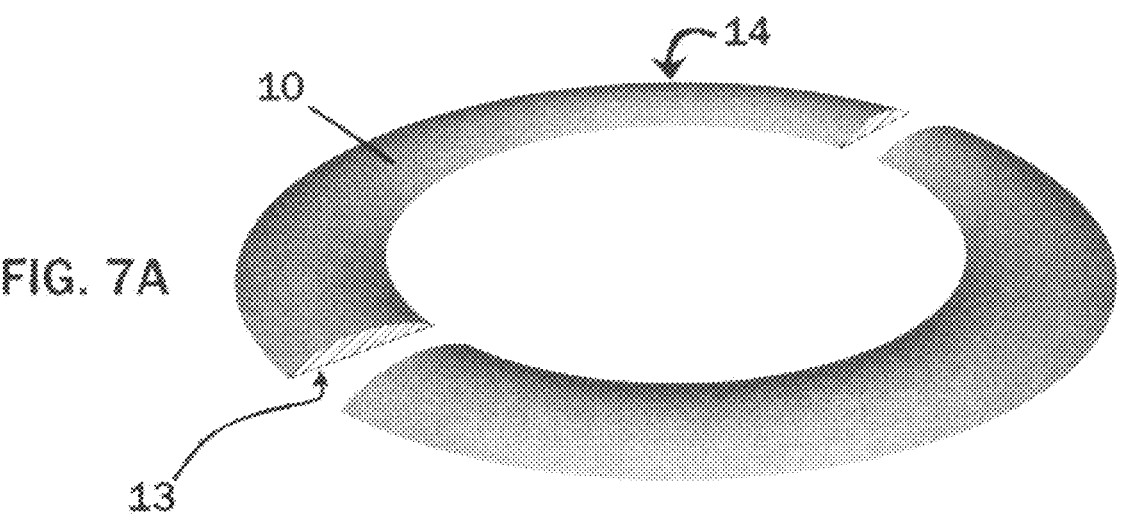
FIG. 7A is a perspective cutaway view of a ring-shaped lifting body rotor blade.
Figure 7B:
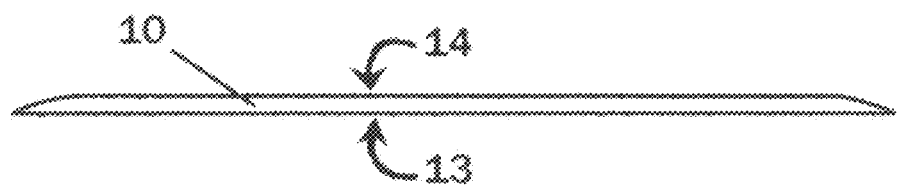
FIG. 7B is a side view of the ring-shaped lifting body rotor blade.
Figure 7C:
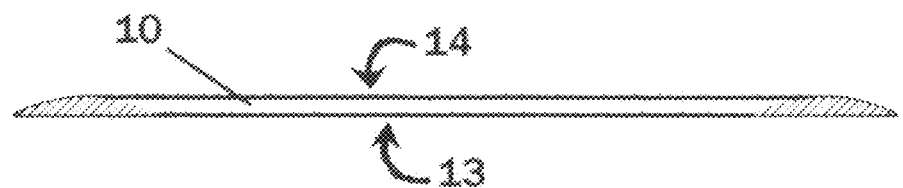
FIG. 7C is a sectional side view of the ring-shaped lifting body rotor blade.
Figure 8A:
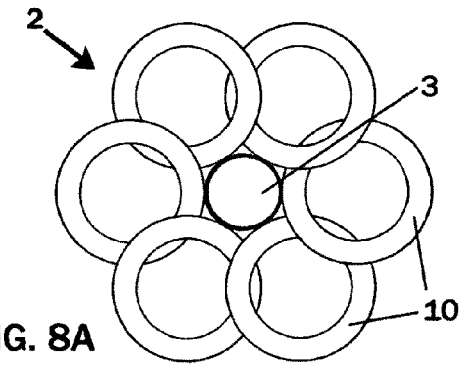
FIGS. 8A-8F are planform views of alternate embodiments of rotor assemblies exhibiting differing ratios of central hub size to lifting body rotor blade size, differing numbers of lifting body rotor blades, and wherein blades overlap adjacent blades to differing extents.
Figure 8B:
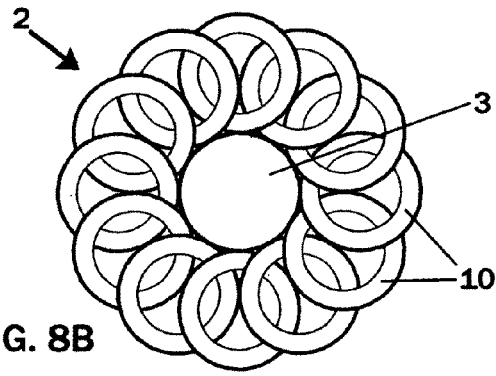
Figure 8C:
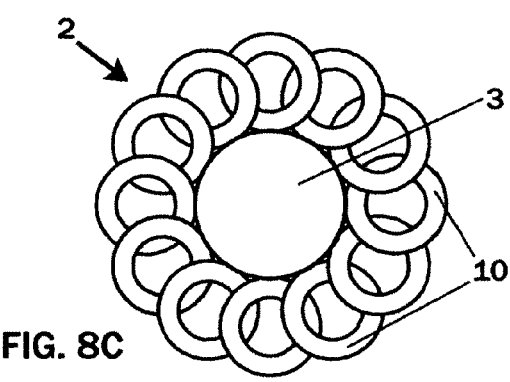
Figure 8D:
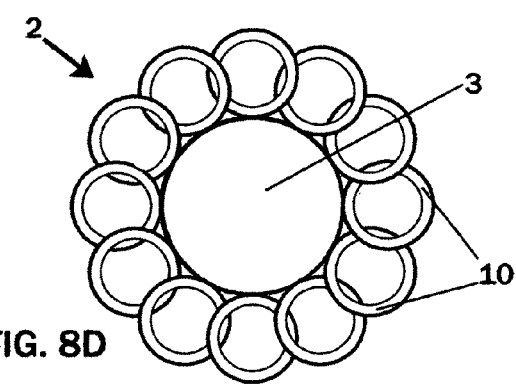
Figure 8E:
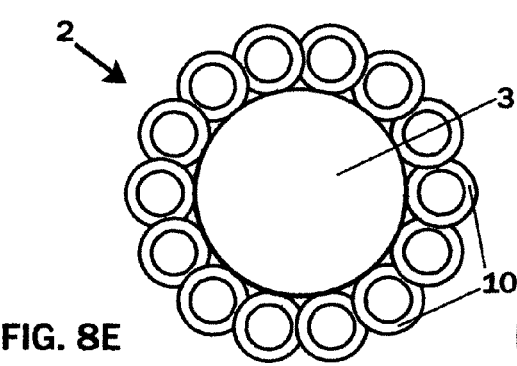
Figure 8F:
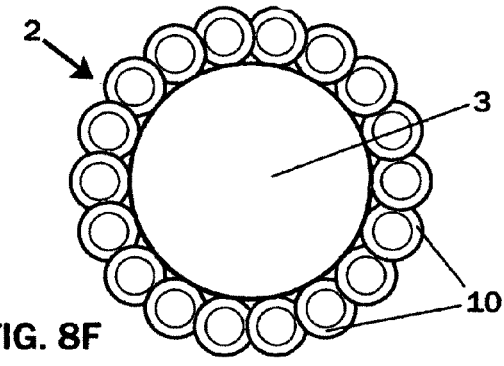

FIG. 7A depicts a preferred embodiment of a lifting body rotor blade 10, which is ring-shaped with a flattish upwind surface 13, and a curved downwind surface 14. FIG. 7B is an elevation view of the lifting body rotor blade 10 of FIG. 7A. FIG. 7C is a cross sectional view of the lifting body rotor blade 10 of FIG. 7A showing the airfoil profiles of opposing sections of the lifting body rotor blade 10.

The number of lifting body rotor blades 10 attached around the perimeter of a rotatable central hub 3 may vary, as shown in FIGS. 8A-8F. It is anticipated that experimentation will demonstrate the optimum shapes of rotor blades 10, the optimum sizes of rotor blades 10 relative to a rotatable central hub 3, the optimum number of lifting body rotor blades 10 attached around the perimeter of a rotatable central hub 3, and the optimum intervals between attachment points around the perimeter of a central hub 3.

Figure 9A:
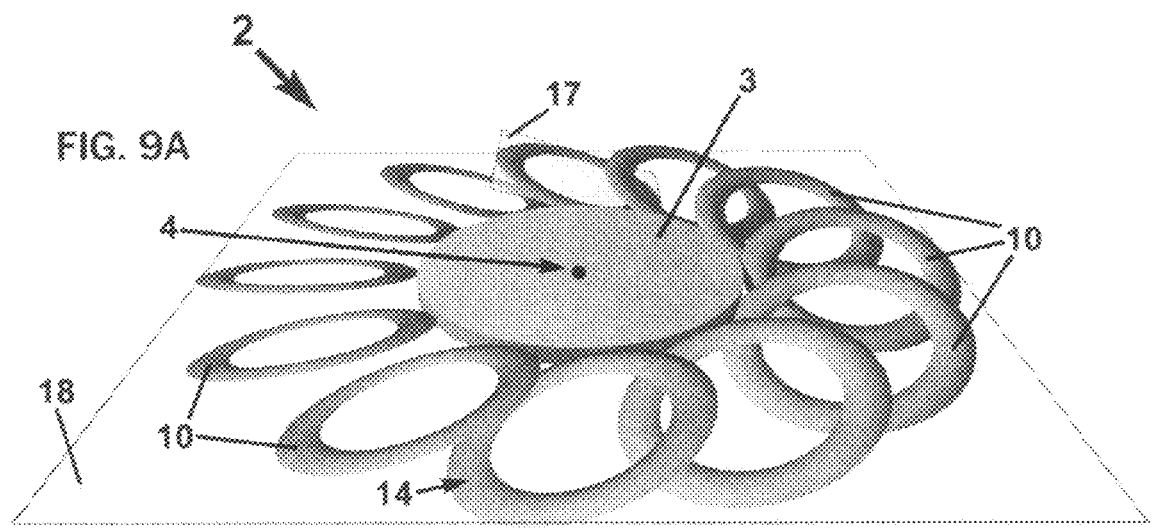
FIGS. 9A-9B are perspective views looking at the downwind and upwind sides of a preferred embodiment of a wind turbine rotor assembly with lifting body rotor blades illustrating geometric and dimensional relationships among the components.
Figure 9B:
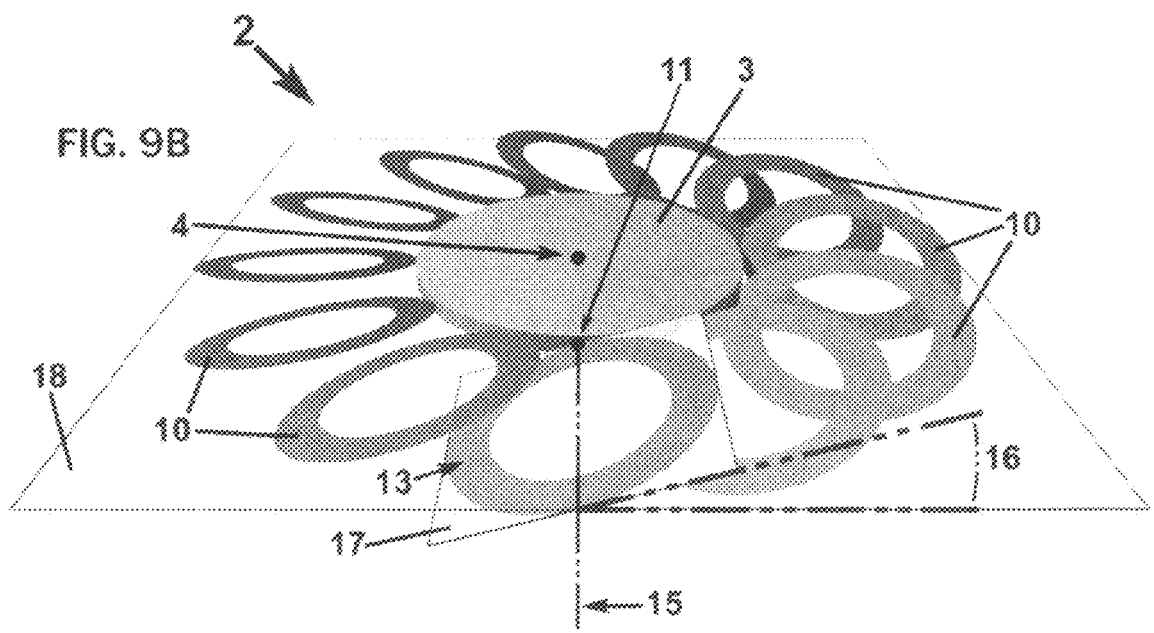

FIGS. 9A and 9B show perspective views of the downwind and upwind sides of a preferred embodiment of a rotor assembly 2 with lifting body rotor blades 10, wherein the rotor blades are shown in their operating positions with equal angles of incidence, and wherein the lifting body rotor blades 10 are uniform in shape and size and include apertures. FIG. 9A shows a view from the downwind side of rotor assembly 2 wherein are depicted the center point 4 of rotatable central hub 3, the curved downwind surfaces 14 of lifting body rotor blades 10, the plane 17 of one individual lifting body rotor blade 10, and the rotational plane 18 of the rotor assembly 2. FIG. 9B shows a view from the upwind side of rotor assembly 2 wherein are depicted the center point 4 of rotatable central hub 3, the flattish upwind surfaces 13 of lifting body rotor blades 10, the plane 17 of one individual lifting body rotor blade 10, and the rotational plane 18 of the rotor assembly 2. FIG. 9B shows the individual lifting body rotor blade 10, attached at its root connection point 11 to the rotatable central hub 3. A segment of the root axis 15 of the individual lifting body rotor blade 10 extends from the blade's attachment point on the perimeter of central hub 3 past the outermost edge of the rotor blade 10. The plane 17 of the individual lifting body rotor blade 10 intersects the rotational plane 18 of the central hub 3 along the root axis 15. In the depicted embodiment the angle of incidence 16 of the plane 17 of the individual lifting body rotor blade, relative to the rotational plane 18 of the rotor assembly 2, is established by rotating the rotor blade 10 about its root axis 15. This angle of incidence 16 is variable and may also be adjustable. It is anticipated that experimentation will demonstrate optimum angle(s) of incidence 16 and optimum adjustment ranges.

Figure 10A:
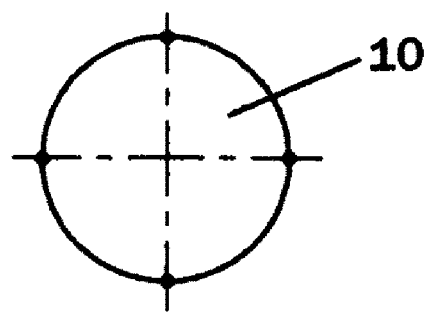
FIG. 10A is a diagrammatic planform view of a lifting body exhibiting a 1:1 planform aspect ratio.
Figure 10B:
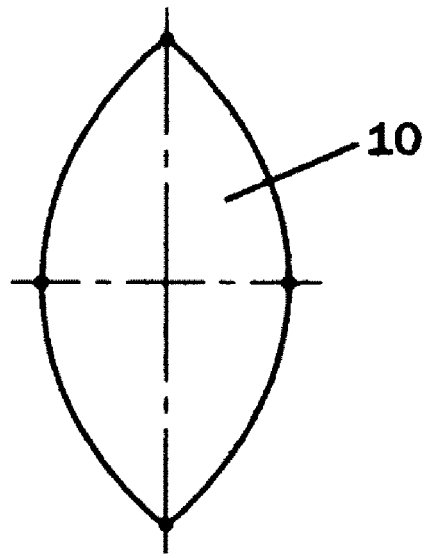
FIG. 10B is a diagrammatic planform view of a hybrid lifting body exhibiting a 2:1 planform aspect ratio.
Figure 10C:
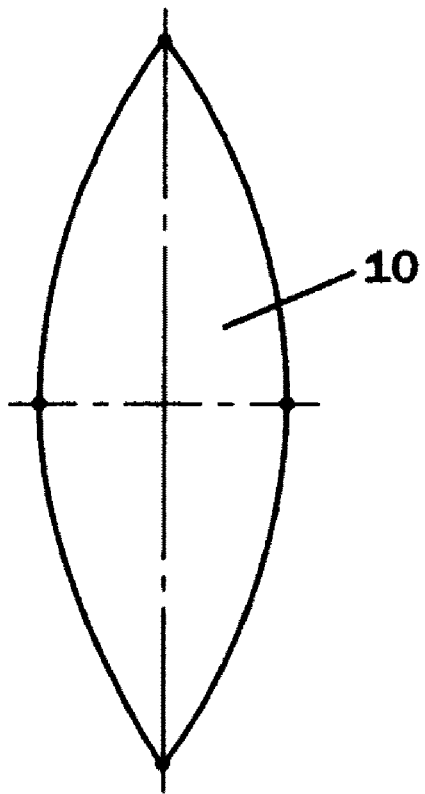
FIG. 10C is a diagrammatic planform view of a wing exhibiting a 3:1 planform aspect ratio characteristic of the minimum wing aspect ratio; and, FIG. 11 is a planform view of a preferred embodiment of a wind turbine rotor assembly with six non-overlapping lifting body rotor blades.

Referring to FIG. 10A, the planform view of a lifting body rotor blade 10 has a circular shape with a planform aspect ratio of approximately 1:1. Shown in FIG. 10B, a lifting body rotor blade 10 has an elongated shape with a planform aspect ratio of approximately 2:1. Shown in FIG. 10C, a rotor blade 10 has a further elongated shape with a planform aspect ratio of approximately 3:1, and consequently may correspond with the smallest aspect ratio wing or with the largest aspect ratio hybrid lifting body depending on the actual size of the physical embodiment constructed according to the shape.

Figure 11:
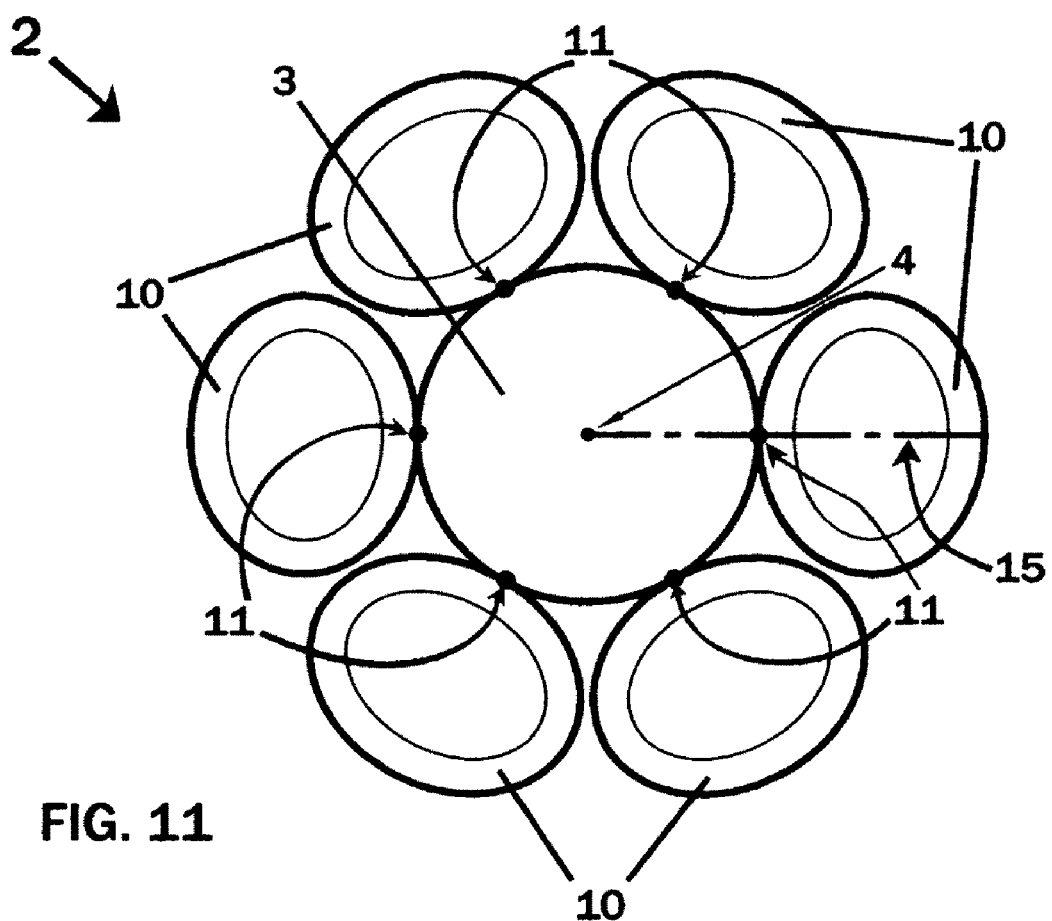

Referring to FIG. 11, there is shown an embodiment of a horizontal axis wind turbine rotor blade assembly 2 with non-overlapping lifting body rotor blades 10 attached at their root connection points 11 to rotatable central hub 3. FIG. 11 shows the root axis 15 of one individual lifting body rotor blade 10, extending from center point 4 of rotatable central hub 3, through root connection point 11 of the lifting body rotor blade 10, to the outermost edge of the lifting body rotor blade 10. The segment of root axis 15, from root connection point 11 of the lifting body rotor blade to the outermost edge of the lifting body rotor blade, defines the span line of the lifting body rotor blade.

What is claimed is:

1. A wind turbine system for use in an incident windstream, comprising:
    a wind turbine mounted to rotate about a horizontal axis and connected to drive an energy conversion device, said wind turbine comprising a central hub and a plurality of lifting body rotor blades mounted to and extending radially outwardly from said hub and around said horizontal axis;
    each of said rotor blades having a closed loop inner aperture passing completely through the blades in an upwind facing surface, said aperture having a surface area which is a substantial portion of an overall area of said upwind facing surface, a root connection point of the rotor blade where it attaches to the central hub, a radial span of each rotor blade being defined by a line segment extending radially outwardly from said hub from the root connection point of the rotor blade to an outside edge of the rotor blade, a chordal width of each rotor blade being defined by a chord line intersecting and perpendicular to the span and intersecting and terminating at opposing outermost edge points of the rotor blade having a greatest width between said edge points, and an aspect ratio of each rotor blade which is a ratio of said span to said chordal width being less than 3:1; and
    each of said lifting body rotor blades comprising an airfoil shape and which is defined by said upwind facing surface and an opposite downwind curved surface which curves outwardly away from said incident windstream.

2. The system of claim 1 further comprising a plane of each rotor blade at least partially facing said incident windstream and intersecting an entire outer peripheral edge surrounding said blade where said upwind surface and downwind curved surface meet, and an angle of incidence of each blade defining an angle of attack to said incident windstream and being defined by an angle between said plane of each rotor blade and a rotational plane of said wind turbine.

3. The system of claim 1 wherein each rotor blade has a root axis defined by a line between a center point of the central hub and said root connection point of the rotor blade where it attaches to the central hub, and wherein said line segment defining said radial span is coincident with the root axis.

4. The system of claim 1 wherein the blades are substantially equally spaced around the hub.

5. The system of claim 1 wherein said aperture in each blade is substantially centrally located within said rotor blade.

6. The system of claim 1 wherein said hub has an outer circular periphery and said rotor blade has an outer peripheral edge which is substantially circular such that the blades are disc-shaped.

7. The system of claim 1 wherein said airfoil shape defines an airfoil cross-section profile which extends from an outer peripheral edge of the blade where the profile is rounded to an inner periphery defined by said inner aperture where the profile comes to a substantial point.

8. The system of claim 1 wherein the upwind surface is substantially flat.

9. The system of claim 1 wherein at least six rotor blades are provided equally spaced around a round outer periphery of said hub.

10. The system of claim 9 wherein at least twelve rotor blades are provided which are equally spaced around said hub.

11. The system of claim 1 wherein said energy conversion device comprises an electrical generator substantially aligned on said horizontal axis and wherein said generator is mounted at one end of a supporting structure for location above ground.

12. The system of claim 1 wherein said rotor blade airfoil shape is defined by a rounded portion at an outer peripheral edge of the blade where said upwind surface and opposite downwind surface merge and has a decreasing thickness towards where the upwind surface and the opposite downwind surface merge at an inner periphery of said inner aperture.

13. The system of claim 1 wherein a portion of an outer peripheral edge of the rotor blade is directly adjacent to an outer periphery of a substantially round hub where the blade mounts to the hub.

14. The system of claim 1 wherein the rotor blades partially overlap.

15. The system of claim 1 wherein the rotor blade aspect ratio is less than 2:1.

16. The system of claim 1 wherein said aspect ratio is no less than 1:1.

17. A wind turbine system for use in an incident windstream, comprising:
    a wind turbine mounted to rotate about a horizontal axis and connected to drive an energy conversion device, said wind turbine comprising a central hub having an outer circular periphery and a plurality of lifting body rotor blades mounted to and extending radially outwardly from said hub and around said horizontal axis with an equal spacing;
    each of said rotor blades having a closed loop circular centrally located inner aperture passing completely through the blades in an upwind facing surface, said aperture having a surface area which is a substantial portion of an overall area of said upwind facing surface, having a root connection point of the rotor blade where it attaches to the central hub, a radial span of each rotor blade being defined by a line segment extending radially outwardly from said hub from the root connection point of the rotor blade to an outside edge of the rotor blade, a chordal width of each rotor blade being defined by a chord line intersecting and perpendicular to the span and intersecting and terminating at opposing outermost edge points of the rotor blade having a greatest width between said edge points, and an aspect ratio of each rotor blade which is a ratio of said span to said chordal width being less than 3:1;
    each of said lifting body rotor blades comprising an airfoil shape and which is defined by said upwind facing surface and an opposite downwind curved surface which curves outwardly away from said incident windstream, a plane of each rotor blade at least partially facing said incident windstream and intersecting an entire outer peripheral edge surrounding said blade where said upwind surface and downwind curved surface meet; and an angle of incidence of each blade defining an angle of attack to said incident windstream and being defined by an angle between said plane of each rotor blade and a rotational plane of said wind turbine.

18. A wind turbine system for use in an incident windstream, comprising:

a wind turbine mounted to rotate about a horizontal axis and connected to drive an energy conversion device, said wind turbine comprising a central hub having an outer circular periphery at least six lifting body rotor blades mounted to and extending radially outwardly from said hub and around said horizontal axis with an equal spacing;

each of said rotor blades having a closed loop circular centrally located inner aperture passing completely through the blades in an upwind facing surface, said aperture having a surface area which is a substantial portion of an overall area of said upwind facing surface, a root axis defined by a line between a center point of the central hub and a root connection point of the rotor blade where it attaches to the central hub, a radial span of each rotor blade being defined by a line segment coincident with said root axis and extending radially outwardly from said hub from the root connection point of the rotor blade to an outside edge of the rotor blade, a chordal width of each rotor blade being defined by a chord line intersecting and perpendicular to the span and intersecting and terminating at opposing outermost edge points of the rotor blade having a greatest width between said edge points, and an aspect ratio of each rotor blade which is a ratio of said span to said chordal width being less than 2:1;

each of said lifting body rotor blades comprising an airfoil shape and which is defined by said upwind facing surface and an opposite downwind curved surface which curves outwardly away from said incident windstream, a plane of each rotor blade at least partially facing said incident windstream and intersecting an entire outer peripheral edge surrounding said blade where said upwind surface and downwind curved surface meet; and an angle of incidence of each blade defining an angle of attack to said incident windstream and being defined by an angle between said plane of each rotor blade and a rotational plane of said wind turbine.

19. The system of claim 18 wherein said outer peripheral edge of each blade is circular and said inner aperture is circular.

20. The system of claim 18 wherein said aspect ratio is no less than 1:1.

21. The system of claim 17 wherein said aspect ratio is no less than 1:1.

* * * * *